July 19, 1938.  C. KAUFMAN  2,124,113
MACHINE FOR MAKING BLANKS
Filed June 17, 1932  2 Sheets-Sheet 1

INVENTOR:
CHARLES KAUFMAN
ATTORNEYS.

July 19, 1938.  C. KAUFMAN  2,124,113

MACHINE FOR MAKING BLANKS

Filed June 17, 1932   2 Sheets-Sheet 2

INVENTOR:
CHARLES KAUFMAN
Kwin Hudson & Kent
ATTORNEYS.

Patented July 19, 1938

2,124,113

UNITED STATES PATENT OFFICE 2,124,113

MACHINE FOR MAKING BLANKS

Charles Kaufman, Garfield Heights, Ohio, assignor, by mesne assignments, to The National Machinery Company, Tiffin, Ohio, a corporation of Ohio Application June 17, 1932, Serial No. 617,814

7 Claims. (Cl. 10—12)

This invention relates to improvements in machines for making blanks, particularly machines employing extrusion operations for the formation of bolt and screw shanks, both as to the part which is to be threaded and that which is to be left unthreaded.

One of the objects of the invention is the provision of a machine in which extrusion operations may be performed simultaneously upon a plurality of blanks in different stages of completion.

Another object is the provision of simple mechanism for transferring the blanks from one station or die to the next succeeding one in the interim between hammer blows.

A further object is the improvement of the detailed construction of the transfer means employed.

Other objects and features of novelty will appear as I proceed with the description of that embodiment of the invention which, for the purposes of the present application, I have illustrated in the accompanying drawings, in which Figure 1 is a plan view of a fragment of a machine showing the stationary die holder and the reciprocating head, the latter traveling on its rearward stroke, and the transfer mechanism being just upon the point of beginning its transverse movement to advance each blank one step.

Figure 2:
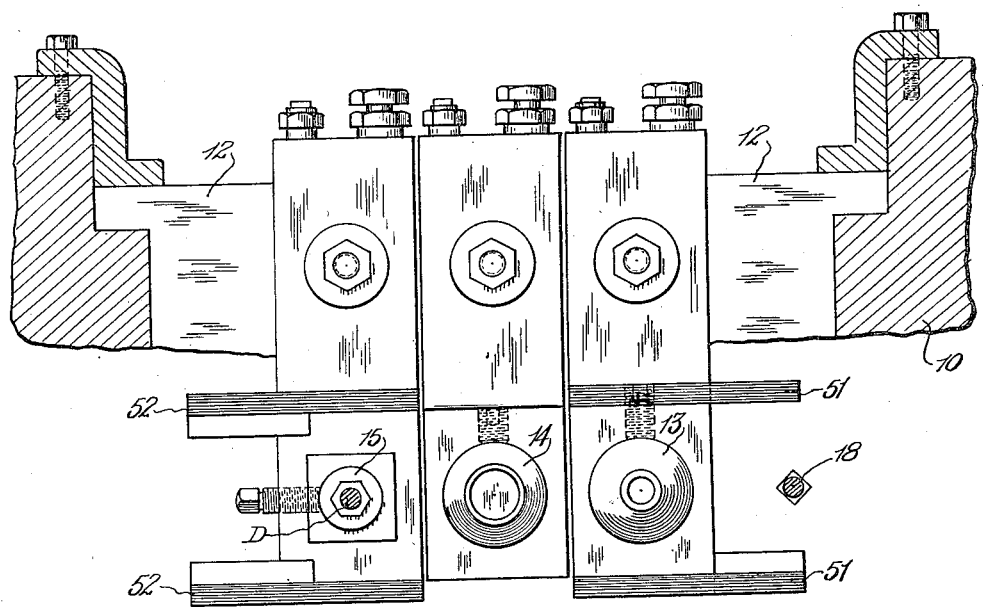
Fig. 2 is a vertical section taken substantially on the line 2—2 of Fig. 1, showing the reciprocating head of the machine and the hammers carried thereby.

In carrying out the invention I employ a machine with a horizontal reciprocating head operating upon the principle of the ordinary upsetting machine of the single blow type. Because of the amount of work to be done, my machine is necessarily relatively large. It embodies a plurality of dies with a corresponding number of cooperating hammers, all operating simultaneously, so that for each complete reciprocation of the head one completed blank is delivered from the machine. In accordance with the invention there are employed at least two extruding dies. A greater number might be employed, if desired, but two will usually be sufficient. The invention also, in some of its aspects, covers the use of a single extrusion die as well as a plurality thereof, combined with one or more dies for performing operations of a different character. One or more of the extrusion dies may, and preferably does, have upsetting functions in addition to extruding functions.

In the drawings the bed of the machine is indicated at 10, comprising a stationary die holder 11. In suitable ways provided in the bed there is a reciprocable head or tool carrier 12, which may be driven from the usual eccentric shaft (not shown). Upon this head are mounted a plurality of tools which, in the present instance, are three in number. Of these tools 13 and 14 are hammers which serve to drive the stock or blank into cooperating dies, while 15 is a hollow trimming die.

In the die holder 11 there is a cut-off die 16 that is provided with a bore 17 of the size of the stock to be operated upon. Some means of conventional character may be employed for feeding the stock through this die step by step at the proper times until the end of the stock contacts an adjustable stop 18 mounted upon a bracket carried by the bed 10 of the machine.

In the same horizontal plane with the die 16, and arranged directly opposite hammer 13, there is a die 19, which has a short cavity 20 at its outer end of the same diameter approximately as the bore 17. Beyond the cavity 20, however, this die has a bore 21 of somewhat smaller diameter. When the stock is driven through the cavity 20 into the bore 21 the metal receives its first extrusion. The extruded portion of the blank formed in this die is of the same diameter as the unthreaded or shank portion of the resulting bolt or screw.

A third die 22 is mounted in the die holder 11 in the same plane with dies 16 and 19 and opposite the hammer 14. This die has an outer socket 23 which may be round and is of relatively large size. Beyond the socket 23 there is a somewhat central bore 24 of the same size as bore 21 in the previous die, and an inner bore 25 of smaller diameter. When the blank is forced into the bore 25, a second extrusion operation is performed which reduces a portion of the previously extruded part of the blank to the pitch diameter of the threads of the finished article.

The face of hammer 13 is recessed, as shown, to receive the stock, and is set back somewhat behind the face of hammer 14 in order not to drive the stock into the die 19 quite all the way. Hammer 14 has a shallow recess 26 with a beveled edge in its front face which registers with socket 23. This hammer and the die 22 come together when the head 12 is in its furthest forward position.

27 is a hollow trimming punch that is mounted in the die holder 11 in transverse alignment with the dies 16, 19 and 22, that is in the same horizontal plane. Preferably also, the faces of the dies 16, 19 and 22 and the punch 27 are in the same vertical plane at right angles to the direction of movement of the head.

Figure 1:
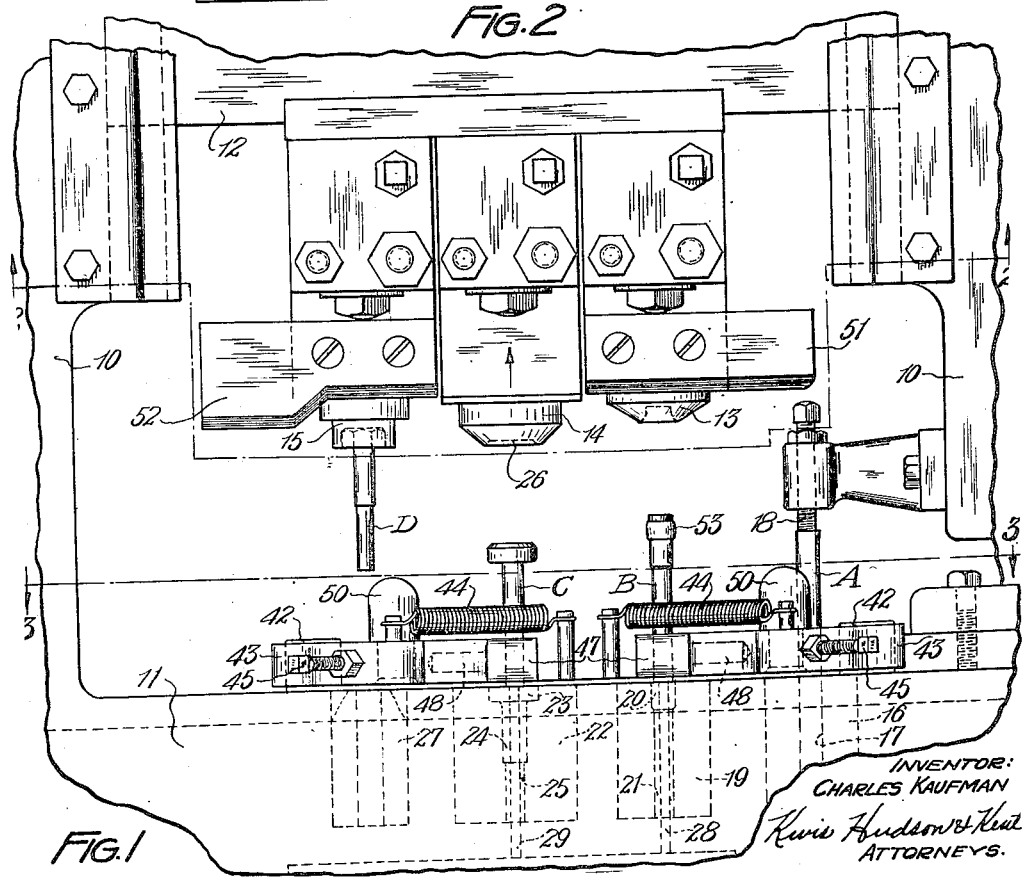

In the drawings I have shown the stock from which the blanks are formed at A, the first blank at B, the second blank at C, and the final blank with trimmed head at D. When the blanking operations for a given stroke of the head have been completed and the head has receded a certain distance, knock-out rods 28 and 29 enter the bores of dies 19 and 22 and eject the blanks B and C, as indicated in Fig. 1. The head of blank D remains tightly wedged in the trimming die 15 after the operating stroke of the head is completed, and consequently the blank D moves rearwardly with the head, as indicated in Fig. 1. When the next blank C is positioned in the hollow punch 27, the forward travel of the head 12 serves to push the blank D into the hollow die 15, from the rear end of which it is discharged in due course into some suitable receptacle. Of course, the hollow trimming punch 27 trims the shank of the blank D.

Referring now to the cut-off and transfer mechanisms, 30 is a transversely reciprocable shaft or bar having a slide bearing at 31 in the bed of the machine, and a second slide bearing at 32 in a cover plate 33 bolted to the bed of the machine. Beneath the bar 30 there is a slide 34 movable longitudinally of the machine, that is parallel to the direction of movement of the head 12. The movement of the slide 34 may be imparted to it by suitable means properly timed to the other operations of the machine, as for instance by a connecting rod 35 which is actuated preferably by a cam or other means operatively associated with the eccentric shaft of the machine (not shown). The slide 34 is provided with a cam groove 36 within which runs an anti-friction roller or wheel 37 that is rotatably mounted upon a stud secured to the lower side of bar 30. When the slide 34 moves back and forth once for each complete reciprocation of the head 12, the roller 37 will be shifted back and forth laterally of the machine by the cam groove 36, and the bar 30 will be correspondingly reciprocated.

The bar 30 at its inner end is bolted to a frame 38 which slides in suitable guides on the exposed face of the die holder 11. This frame comprises a pair of spaced parallel bars 39. Midway between these bars there is a cut-off blade 40, to the top and bottom edges of which there are attached spring fingers 41 with beveled outer extremities which ride over the work when the latter is held against movement, and serve to retain the work in the groove at the forward end of the cut-off blade 40 when the latter has performed its severing operation and is traveling transversely of the machine.

Each of the bars 39 carries two pivot pins 42, those of one bar being arranged directly opposite those of the other bar. On these four pins there are mounted four bell crank levers 43. Four coil springs 44, each attached at one end to a bar 39 and at the other end to the arm of a bell crank lever 43, act to move the inner arms of the bell cranks inwardly, movement in this direction being limited however by adjustable stop screws 45 mounted in the bell cranks and engaging projections 46 on the bars 39. At its inner end each of the bell cranks has removably mounted therein a work gripping jaw 47, the connection being effected by a stud 48 integral with the jaw which extends into a socket in the lever formed to receive it. One wall of the socket is split and the jaws are drawn together after the stud is in place by means of a screw 49. By virtue of this construction unusual strains put upon the jaws 47 tend to make them swing about the axes of studs 48, and should one of the jaws be broken or damaged the jaw alone may be replaced, thereby eliminating the necessity of replacing an entire bell crank.

A post 50 projects from each of the bell cranks 43. The outer ends of these posts are curved, hemispherically or otherwise, to present cam surfaces, and are adapted to engage with beveled edges on plates 51 and 52 which are mounted above and below the hammer 13 and the trimming die 15 in symmetrical arrangement about the principal horizontal plane. When the head 12 approaches the die holder 11 closely enough, the outer ends of the posts 50 ride over the beveled edges of the plates 51 and 52 and are moved outwardly away from the plane of the dies, thereby spreading apart or opening up the gripping jaws 47. In this manner the gripping jaws are moved out of the way in time to permit the hammers to advance and push the work into the dies.

Figure 3:
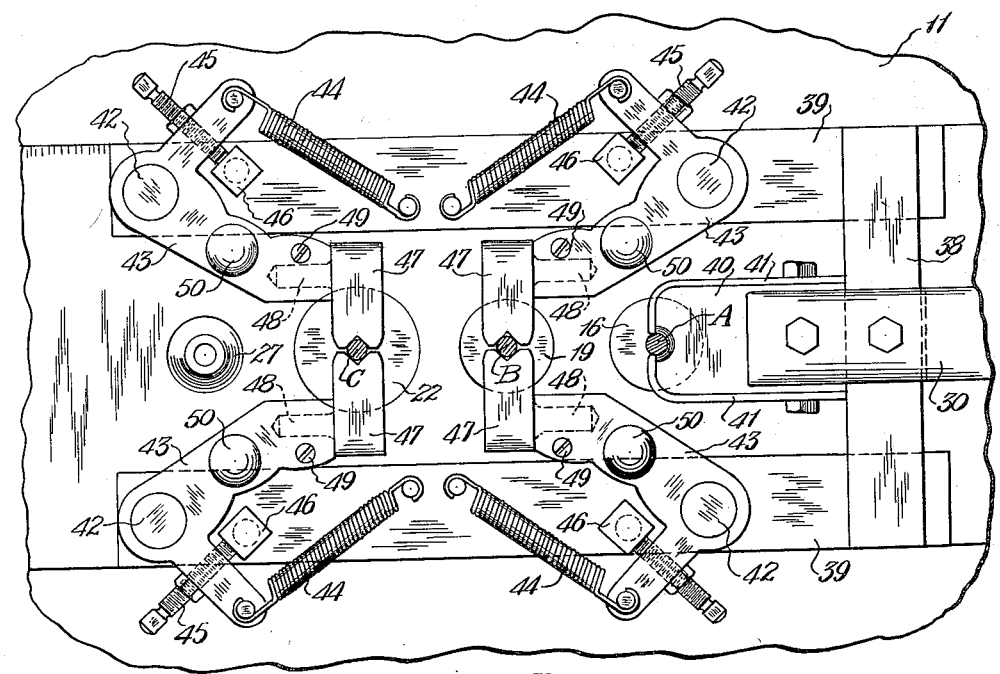
Fig. 3 is an elevational view, partly in section, on the line 3—3 of Fig. 1 showing in detail the transfer mechanism and the mechanism for cutting the stock to length. The apparatus in this figure is inverted however, in order to make the positions of the dies from left to right correspond with those of Fig. 1.
Figure 4:
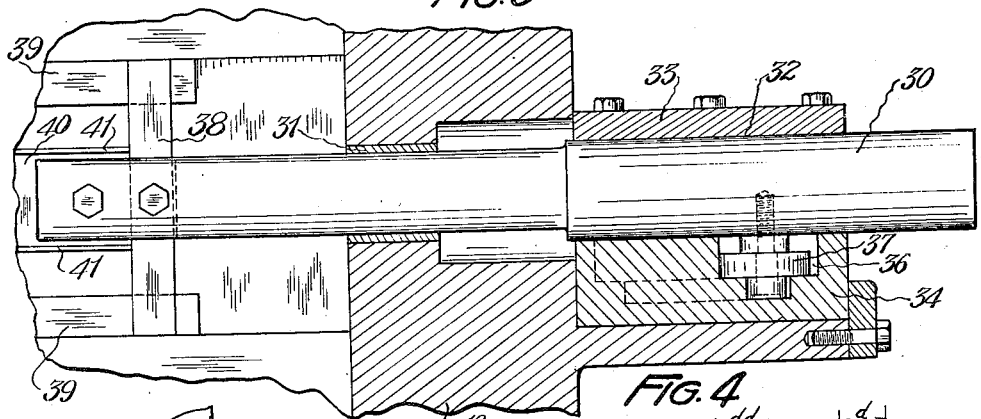
Fig. 4 is a vertical transverse sectional view showing the reciprocating shaft or bar which carries the transfer and cut-off mechanisms, this view being taken substantially on the line 4—4 of Fig. 5.
Figure 5:
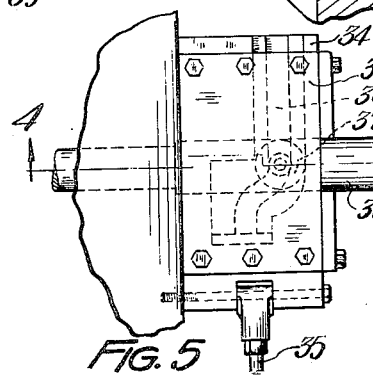
Fig. 5 is a fragmental plan view showing the reciprocating slide within which is formed the cam groove that serves to actuate the transversely movable mechanisms.

*Operation.*—Assuming that there are blanks B and C in dies 19 and 22 respectively, and a blank D in hollow punch 27, and that the head 12 has just finished its operating stroke, the head then begins to recede, the blank D being drawn out of the punch and traveling with the head. At this time the transfer and cut-off mechanisms are positioned one station toward the left from the position shown in Fig. 3. The blank B is then gripped between the cut-off blade 40 and its fingers 41, it being unnecessary for this blank to be released because the hammer 13 does not advance quite as far as the blade and its fingers. The jaws 47 however are retracted by the engagement of the posts 50 with the plates or blades 51 and 52. Then, of course, at this time the blanks are simultaneously subjected to the various steps of the forming operation. That is, each set of cooperative dies (e. g., one set includes a lower die such as 19 and the socket of an upper hammer such as 13) operates upon a blank positioned therebetween and forms that blank consistent with the stage or step of the forming procedure adapted to be carried out thereby. The frame 38 and associated parts now move toward the right, the fingers 41 riding over the blank B. Next the knock-out rods 28 and 29 move into the bores of dies 19 and 22 to the positions shown in Fig. 1, thereby ejecting the blanks B and C to the positions shown. Hammers 13 and 14 are withdrawn sufficiently to permit the blanks to take the position shown in Fig. 1. Now, by the time the transfer mechanism has moved laterally to the position shown in the drawings, the blades 51 and 52 draw away from posts 50, thereby permitting springs 44 to pull the two pairs of gripping jaws 47 into contact with the work. The remainder of the ejecting movement is carried through while the jaws are in actual engagement with the blanks, so that the instant the knock-out rods 28 and 29 stop advancing the blanks B and C are firmly gripped. In the meantime the stock feed has caused a new length of stock to advance through die 16 and through the groove in the cut-off blade 40 into engagement with stop 18.

Now the movement of the transfer mechanism and cut-off mechanism to the left in Figs. 1 and 3 is again resumed. The exposed length of stock is thereby cut off and carried to position in front of die 19, while the blanks B and C are transferred to new positions in front of die 22 and hollow punch 27 respectively.

On the next succeeding forward stroke of the head 12, the blank D first engages the head on the blank C, causing the blank C to enter the hollow punch 27. As soon as the head of the blank C contacts with the end of the punch and is brought to a stop thereby, blank D is driven into the hollow die 15. Immediately thereafter the blank C, which is in the punch 27, is trimmed by the die 15 to form a new blank D, and at about the same time the blank B which is in the die 22 is struck by the hammer 14, a portion of its shank extruded, and its head upset into the recess 23 of the die and the socket 26 of the hammer. Shortly after the hammer 14 strikes the blank B, hammer 13 strikes the length of stock A which is in front of die 19, and drives the same into the die, where it receives its first extrusion. That short portion of the stock which remains outside the die is gathered to some extent, as indicated at 53. In other words there is a slight upsetting of the metal outside the first die 19, while, as we have already seen, a considerable upsetting takes place in the die 22.

Figure 6:
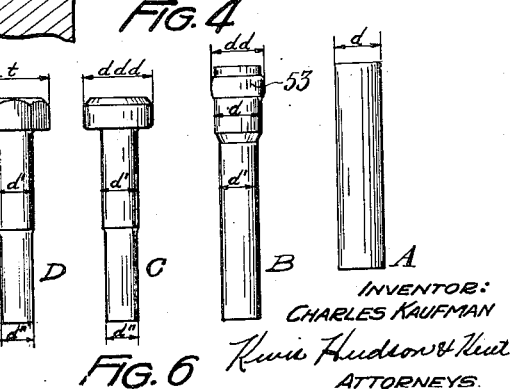
Fig. 6 is a detail view illustrating the blanks in the four stages of completion through which they pass in being acted upon by the machine as here shown.

In order that the successive operations and the relative diameters of the various portions of the blanks throughout the different stages of completion may be the more readily followed, I have illustrated in Fig. 6 the different conditions of the work in the four stations of the machine following the operations performed upon them in those stations. In this figure the diameter of the original stock is represented by the character $d$, the diameter of the first extruded portion by the character $d'$, and that of the second extruded portion by the character $d''$. The diameter of the gathered metal portion or first upsetting is indicated at $dd$ and the diameter of the upset head at $ddd$. The long diameter of the trimmed head is indicated at $t$. It will be noted that the metal which is upset to form the head in blank C comprises a part $d$ of the original diameter of the stock as well as the part $dd$ which is of slightly greater diameter than the original stock.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. A transfer mechanism for machines of the character described, comprising a pair of spaced parallel bars, means for reciprocating said bars together parallel to their lengths, two pairs of oppositely positioned bell cranks pivotally mounted on said bars having opposed blank gripping fingers, springs carried by said bars tending to move said bell cranks about their pivots to bring the gripping fingers together, said pairs of bell cranks being reversely arranged, and projections carried by the bell cranks adapted to be engaged by the reciprocating head of the machine for swinging the gripping fingers of each pair away from each other to clear the space between the dies and hammer.

2. In a machine for making bolt blanks and the like, a die and a hammer, means for reciprocating them relatively to each other, transfer mechanism adapted to position work between said die and hammer, said mechanism comprising a pair of fingers movable in a plane at right angles to the direction of reciprocation for gripping and ungripping the work, one of said fingers comprising a gripping jaw having a shank mounted in a socket in the finger proper and adapted to turn under excessive pressure.

3. A machine for simultaneously conducting a plurality of steps of a blank forming procedure, said machine having a suitable bed structure, a plurality of dies mounted on a common plane and carried by said structure, said dies including a cut-off die, a plurality of hammers carried by the bed and adapted to reciprocate therein and to move to and from cooperating relationship with respect to said dies, a slide carried by said bed and adapted to move between said dies and said hammers, said slide having a blade adapted to cut off a piece of stock extending from said cutting-off die, fingers mounted on said slide adjacent said cutting-off blade and adapted to hold a cut-off blank against said cutting-off blade, said slide also carrying groups of fingers, each group having a spacing with respect to each other and with respect to the fingers of said cutting-off blade which corresponds to the spacing between adjacent dies, and means for simultaneously moving the fingers of said slide and said cutting-off blade from a position in line with one die to a position in line with an adjacent die, one of said hammers being adapted to operate upon a blank while held by said cutting-off blade, and means for simultaneously moving said hammers into a cooperating and blank-forming relation with respect to said dies, and means for moving said group of blank-holding fingers to an open position immediately prior to an abutment of a hammer with respect to a die, a second hammer adapted to be simultaneously moved by said hammer moving means with said first-mentioned hammer and for the same distance, said first-mentioned hammer having a receded relationship with respect to said second-mentioned hammer, said receding relation preventing said first-mentioned hammer from moving past the cutting-off blade and into abutment with a die in line therewith, so that said cutting-off blade and its fingers need not be withdrawn prior to the forming operation upon the blank held thereby, and so that the portion of the blank held thereby between said blade and said first-mentioned hammer will be partially upset in the blank forming operation of said hammers.

4. A machine for simultaneously conducting a plurality of steps in a blank forming procedure which includes, a plurality of dies mounted on the same transverse plane, a tool carrier having a plurality of shaping portions, means for moving said tool carrier, and thus, each of said portions to a cooperative relationship with respect to one of said dies for carrying out a stage in the blank forming procedure, one of said shaping portions having a receding relationship with respect to another shaping portion, both of said portions being movable the same distance toward their respective dies, and a transfer mechanism for moving a blank to a position in line with the receding shaping portion, said receding portion retaining the same relationship with respect to the other shaping portion when the latter is moved into an abutting relationship with respect to its die, so that said receding portion will be at all times spaced from its respective die and that the transfer mechanism need not be withdrawn nor opened during the actual forming operation.

5. A machine for making headed bolt blanks having an extruded shank portion suited for roll threading comprising a bed frame having a series of aligned dies and a transfer mechanism, a reciprocating hammer or header slide, said transfer mechanism arranged to receive a bolt blank extruded for a portion of its length and upset for another portion of its length upon ejection of said blank subsequent to said extrusion and heading and transferring said blank into a position in alignment with another die of said series to effect further extrusion and heading comprising a pair of spaced parallel bars, means for reciprocating said bars together parallel to their lengths, two pairs of oppositely positioned bell cranks pivotally mounted on said bars having opposed blank gripping fingers, spring means connected to said bell cranks to urge said fingers toward each other into a blank gripping position, said pairs of bell cranks being reversely arranged, and projections carried by said bell cranks adapted to be engaged by the hammer arranged to effect said heading to swing the gripping fingers of each pair away from each other to clear the space between the dies and the hammer as said hammer or header slide advances to effect said heading and extrusion.

6. In a machine adapted to successively extrude and head a bolt blank cut from rod stock of uniform diameter, a bed frame, a series of aligned dies to effect said successive extruding and heading and a transfer to progressively advance said bolt blank through its successive fabricating steps comprising a pair of fingers movable in a plane at right angles with respect to the direction of header slide reciprocation for gripping a blank upon its ejection from one of said dies and releasing the blank in alignment with the next adjacent die, one of said fingers comprising a gripping jaw mounted on the body of the finger, said last named mounting constructed and arranged to be responsive to excessive pressure applied to the jaw and effect a movement of the jaw with respect to the body of the finger.

7. A machine for making headed bolt blanks comprising a bed frame having a die breast and a reciprocating header slide, a plurality of blank fabricating tools on the die breast and header slide, the tools on the die breast being arranged in a straight line and comprising in sequence a cut-off die, a first extrusion die, a second extrusion die, and a trimming punch, and the tools on the header slide comprising a punch co-operating with the first extrusion die arranged to drive a blank thereinto upon forward movement of the header slide, a heading punch co-operating with the second extrusion die and operating to drive a blank thereinto and upset the end of the blank to form a head, and a trimming die co-operating with the trimming punch on the die breast to trim the head of the blank, a cut-off knife movable across the face of the cut-off die and operating to cut off a length of stock fed through the die and carry such cut-off length into alignment with the first extrusion die and a transfer mechanism comprising a reciprocating carriage having two sets of co-operating gripping fingers, one set being arranged to grip a blank ejected from the first extrusion die and carry the same into alignment with the second extrusion die, and the other set being arranged to grip a blank ejected from the second extrusion die and carry the same into alignment with said trimming punch.

CHARLES KAUFMAN.